(12) United States Patent
Whittle et al.

(10) Patent No.: US 11,149,568 B2
(45) Date of Patent: Oct. 19, 2021

(54) SLIDING CERAMIC MATRIX COMPOSITE VANE ASSEMBLY FOR GAS TURBINE ENGINES

(71) Applicants: Rolls-Royce plc, London (GB); Rolls-Royce High Temperature Composites Inc., Cypress, CA (US)

(72) Inventors: Michael J. Whittle, London (GB); Michael G. Abbott, Cypress, CA (US); Austin R. Warmuth, Cypress, CA (US)

(73) Assignees: Rolls-Royce plc; Rolls-Royce High Temperature Composites Inc., Cypress, CA (US)

( * ) Notice: Subject to any disclaimer, the term of this patent is extended or adjusted under 35 U.S.C. 154(b) by 208 days.

(21) Appl. No.: 16/227,617

(22) Filed: Dec. 20, 2018

(65) Prior Publication Data

US 2020/0200023 A1   Jun. 25, 2020

(51) Int. Cl.
| | | |
|---|---|---|
| *F01D 9/04* | (2006.01) | |
| *F01D 5/18* | (2006.01) | |
| *F01D 5/22* | (2006.01) | |
| *F01D 5/28* | (2006.01) | |

(52) U.S. Cl.
CPC ............. *F01D 9/042* (2013.01); *F01D 5/187* (2013.01); *F01D 5/225* (2013.01); *F01D 5/282* (2013.01); *F01D 9/041* (2013.01); *F05D 2240/126* (2013.01); *F05D 2240/80* (2013.01); *F05D 2260/20* (2013.01); *F05D 2260/30* (2013.01); *F05D 2300/6033* (2013.01)

(58) Field of Classification Search
CPC . F01D 9/042; F01D 9/04; F01D 9/044; F01D 9/00; F01D 9/045; F01D 9/06; F05D 2240/12; F05D 2240/126; F05D 2240/128; F05D 2240/80; F05D 2260/20; F05D 2260/30; F05D 2300/6033
USPC ....................................... 415/208.1
See application file for complete search history.

(56) References Cited

U.S. PATENT DOCUMENTS

| | | | | |
|---|---|---|---|---|
| 3,700,348 | A * | 10/1972 | Corsmeier | F01D 5/189 416/90 R |
| 4,519,745 | A * | 5/1985 | Rosman | F01D 5/284 416/241 B |
| 5,284,011 | A | 2/1994 | Von Benken | |
| 5,630,700 | A | 5/1997 | Olsen et al. | |
| 6,325,593 | B1 | 12/2001 | Darkins, Jr. et al. | |
| 6,464,456 | B2 | 10/2002 | Darolia et al. | |
| 6,514,046 | B1 * | 2/2003 | Morrison | F01D 9/02 416/229 A |

(Continued)

FOREIGN PATENT DOCUMENTS

EP    2204537 A2    7/2010

OTHER PUBLICATIONS

Extended European Search Report, European Application No. 19214144.8-1004, dated Apr. 6, 2020, 8 pages.

*Primary Examiner* — Kenneth Bomberg
*Assistant Examiner* — Christopher R Legendre
(74) *Attorney, Agent, or Firm* — Barnes & Thornburg LLP (57) ABSTRACT

A turbine vane assembly adapted for use in a gas turbine engine includes a support strut and a vane. The support strut is made of metallic materials. The vane is made of composite materials and is arranged around the support strut to insulate the metallic materials of the support strut during use of the turbine vane assembly.

13 Claims, 9 Drawing Sheets

(56) References Cited

U.S. PATENT DOCUMENTS

| | | |
|---|---|---|
| 6,558,114 B1 | 5/2003 | Tapley et al. |
| 6,648,597 B1 | 11/2003 | Widrig et al. |
| 7,114,917 B2 | 10/2006 | Legg |
| 7,452,189 B2 | 11/2008 | Shi et al. |
| 7,762,766 B2 | 7/2010 | Shteyman et al. |
| 7,824,152 B2 | 11/2010 | Morrison |
| 8,210,803 B2 | 7/2012 | Schaff et al. |
| 8,454,303 B2 | 6/2013 | Garcia-Crespo |
| 9,097,141 B2 | 8/2015 | Paradis |
| 9,335,051 B2 | 5/2016 | Jarmon et al. |
| 9,546,557 B2 | 1/2017 | Grooms, III et al. |
| 9,915,159 B2 | 3/2018 | Huizenga et al. |
| 10,174,627 B2 | 1/2019 | Chang et al. |
| 2010/0068034 A1 | 3/2010 | Schiavo et al. |
| 2010/0119807 A1* | 5/2010 | Lane ................ C04B 38/0038 428/307.7 |
| 2014/0001285 A1 | 1/2014 | Grooms, III et al. |
| 2014/0234118 A1 | 8/2014 | Beaujard et al. |
| 2014/0255174 A1 | 9/2014 | Duelm et al. |
| 2016/0003072 A1 | 1/2016 | Chang et al. |
| 2016/0123163 A1 | 5/2016 | Freeman et al. |
| 2016/0123164 A1 | 5/2016 | Freeman et al. |
| 2016/0177761 A1 | 6/2016 | Huizenga et al. |
| 2016/0201488 A1 | 7/2016 | Carr et al. |
| 2016/0290147 A1 | 10/2016 | Weaver |
| 2017/0022833 A1 | 1/2017 | Heitman et al. |
| 2017/0051619 A1 | 2/2017 | Tuertscher |
| 2017/0298748 A1 | 10/2017 | Vetters et al. |
| 2018/0045117 A1 | 2/2018 | Groves, II et al. |
| 2018/0223680 A1 | 8/2018 | Hafner |
| 2018/0328187 A1 | 11/2018 | Oke |
| 2018/0340431 A1 | 11/2018 | Kerns et al. |
| 2018/0370158 A1 | 12/2018 | Gallier et al. |
| 2019/0145270 A1* | 5/2019 | Dunn .................. F01D 9/04 428/33 |
| 2020/0200023 A1* | 6/2020 | Whittle ............... F01D 9/042 |

* cited by examiner

SLIDING CERAMIC MATRIX COMPOSITE VANE ASSEMBLY FOR GAS TURBINE ENGINES

FIELD OF THE DISCLOSURE

The present disclosure relates generally to vane assemblies for gas turbine engines, and more specifically to vanes that comprise ceramic-containing materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in vanes and rotating blades of the turbine. The interaction of combustion products with the airfoils heats the airfoils to high temperatures such the airfoils may be made from high-temperature resistant materials and/or may be actively cooled by supplying relatively cool air to the vanes and blades. To this end, some airfoils for vanes and blades are incorporating composite materials adapted to withstand very high temperatures. Design and manufacture of vanes and blades from composite materials presents challenges because of the geometry and strength required for the parts.

SUMMARY

The present disclosure may comprise one or more of the following features and combinations thereof.

A turbine vane assembly for a gas turbine engine may include a spar, a vane, and a sleeve. The spar may be made of metallic materials and configured to couple the turbine vane assembly to a turbine case. The spar extends radially relative to an axis. The vane may be made of ceramic matrix composite materials and define a primary gas path adapted to conduct hot gases during use of the turbine vane assembly. The sleeve may be located between the spar and the vane to facilitate radial sliding of the vane relative to the spar during use of the turbine vane assembly.

In some embodiments, the vane may include an outer end wall, an inner end wall, and an airfoil. The outer end wall may define an outer boundary of the primary gas path. The inner end wall may be spaced apart radially from the outer end wall to define an inner boundary of the primary gas path. The airfoil may extend radially between and interconnect the outer end wall and the inner end wall and arranged around the spar to shield the spar from the gases in the primary gas path.

In some embodiments, the sleeve may be coupled to the spar for movement with the spar, The sleeve may be rigid and engage with an inner surface of the airfoil to transmit force loads acting on the airfoil to the spar and to allow the inner surface of the airfoil to slide continuously and radially relative to the spar in response to relative thermal growth between the spar and the vane during use of the turbine vane assembly.

In some embodiments, the sleeve may include an attachment surface and a contact surface. The attachment surface is coupled with the spar and a contact surface that engages the inner surface of the airfoil, the attachment surface is shaped to match a contour of the spar, and the contact surface is convex.

In some embodiments, the sleeve may be made of silicon nitride. In other embodiments, the sleeve may comprise self-lubricating materials.

In some embodiments, the sleeve may include a body and an outer diffusion barrier coating. The outer diffusion barrier coating may be adhered to the body.

According to another aspect of the present disclosure, a turbine vane assembly for use in a gas turbine engine may include a spar, a vane, and a sleeve. The spar may be made of metallic materials and configured to couple the turbine vane assembly to a turbine case. The spar extends radially relative to an axis. The vane may be made of ceramic matrix composite materials and may define a primary gas path adapted to conduct hot gases during use of the turbine vane assembly. The sleeve may be located between the spar and the vane to facilitate radial sliding of the vane relative to the spar during use of the turbine vane assembly.

In some embodiments, the vane may include an outer end wall, an inner end wall, and an airfoil. The outer end wall may define an outer boundary of the primary gas path. The inner end wall may be spaced apart radially from the outer end wall to define an inner boundary of the primary gas path. The airfoil may extend radially between and interconnect the outer end wall and the inner end wall and arranged around the spar to shield the spar from the gases in the primary gas path.

In some embodiments, the airfoil may include a side wall and an anti-rotation tab. The anti-rotation tab extends away from the side wall toward the spar and into a cutout defined in the sleeve to block rotation of the vane relative to the spar.

In some embodiments, the sleeve may include a first end and a second end. The second end may be spaced apart from the first end to define a cutout that extends radially entirely through the sleeve.

According to another aspect of the present disclosure, a turbine vane assembly for use in a gas turbine engine may include a spar, a vane, and a sleeve. The spar may be made of metallic materials and configured to couple the turbine vane assembly to a turbine case. The spar extends radially relative to an axis. The vane may be made of ceramic matrix composite materials and may define a primary gas path adapted to conduct hot gases during use of the turbine vane assembly. The sleeve may be located between the spar and the vane to facilitate radial sliding of the vane relative to the spar during use of the turbine vane assembly.

In some embodiments, the sleeve may include a plurality of discrete ribs. Each of the plurality of discrete ribs may be spaced apart from and aligned with a neighboring one of the plurality of discrete ribs.

According to another aspect of the present disclosure, a turbine vane assembly for use in a gas turbine engine may include a spar, a vane, and a sleeve. The spar may be made of metallic materials and configured to couple the turbine vane assembly to a turbine case. The spar extends radially relative to an axis. The vane may be made of ceramic matrix composite materials and may define a primary gas path adapted to conduct hot gases during use of the turbine vane assembly. The sleeve may be located between the spar and the vane to facilitate radial sliding of the vane relative to the spar during use of the turbine vane assembly.

In some embodiments, the vane may include an outer end wall, an inner end wall, and an airfoil. The outer end wall may define an outer boundary of the primary gas path. The inner end wall may be spaced apart radially from the outer end wall to define an inner boundary of the primary gas path. The airfoil may extend radially between and interconnect the outer end wall and the inner end wall and arranged around the spar to shield the spar from the gases in the primary gas path.

In some embodiments, the airfoil may include a radial outer end and a radial inner end. The radial inner end may be spaced apart radially form the radial outer end. The radially inner end may be tapered away from the spar and the sleeve may engage the radially inner end.

According to another aspect of the present disclosure, a turbine vane assembly for use in a gas turbine engine may include a support strut, a vane, and a sleeve. The support strut may be made of metallic materials and extend radially relative to an axis. The vane may be made of ceramic matrix composite materials.

In some embodiments, the vane includes an airfoil. The airfoil may be arranged around the support strut.

In some embodiments, the sleeve may be between the support strut and the airfoil. The sleeve may engage the support strut and the airfoil to transmit force loads acting on the airfoil to the support strut and to allow the airfoil to slide continuously and radially relative to the support strut during use of the turbine vane assembly.

In some embodiments, the sleeve may include an attachment surface and a contact surface. The attachment surface may be coupled with the one of the support strut and the airfoil. The contact surface may engage directly the other of the support strut and the airfoil.

In some embodiments, the sleeve may include a body. The body may have a first end and a second end. The second end may be spaced apart from the first end to define a cutout that extends radially through the body.

In some embodiments, the airfoil may include an anti-rotation feature. The anti-rotation feature may be located in the cutout defined by the sleeve.

In some embodiments, the sleeve may further include an insert. The insert may be located in the cutout and engaged with the support strut and the anti-rotation feature of the airfoil.

In some embodiments, the sleeve and the vane may be integrally formed as a single, one-piece component. In other embodiments, the sleeve and the support strut may be integrally formed as a single, one-piece component.

According to another aspect of the present disclosure, a turbine vane assembly for use in a gas turbine engine may include a support strut, a vane, and a sleeve. The support strut may be made of metallic materials and extend radially relative to an axis. The vane may be made of ceramic matrix composite materials.

In some embodiments, the support strut may include an outer mount panel and a spar. The spar may extend radially inward from the outer mount panel.

In some embodiments, the vane may include an outer end wall, an inner end wall, and an airfoil. The outer end wall may be positioned adjacent the outer mount panel. The inner end wall may be spaced apart radially from the outer end wall. The airfoil may extend radially between and interconnects the outer end wall and the inner end wall.

In some embodiments, the spar may include a body and a retainer band. The retainer band extends away from the body and supports the sleeve to block radial movement of the sleeve relative to the body of the spar.

According to another aspect of the present disclosure, a turbine vane assembly for use in a gas turbine engine may include a support strut, a vane, and a sleeve. The support strut may be made of metallic materials and extend radially relative to an axis. The vane may be made of ceramic matrix composite materials.

In some embodiments, the sleeve may include a plurality of discrete ribs. Each of the plurality of discrete ribs may be spaced apart from and aligned radially with a neighboring one of the plurality of discrete ribs.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
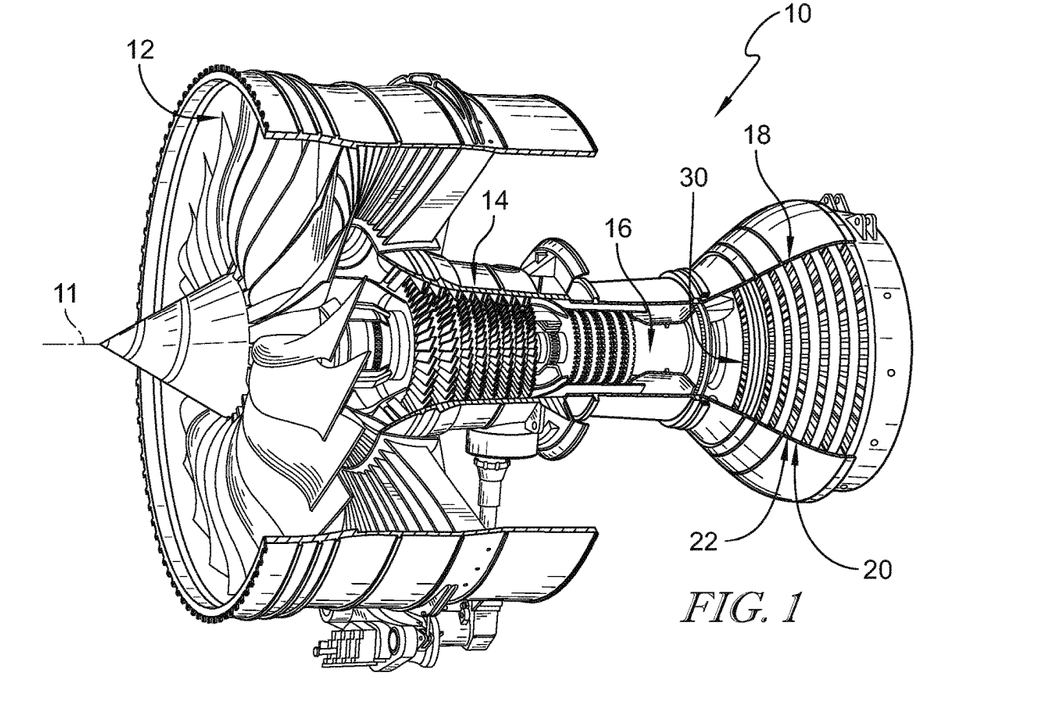
FIG. 1 is a cutaway view of a gas turbine engine that includes a fan, a compressor, a combustor, and a turbine that includes a plurality of turbine wheel assemblies and turbine vane assemblies in accordance with the present disclosure that are adapted to extract work from hot combustion products received from the combustor.
Figure 2:
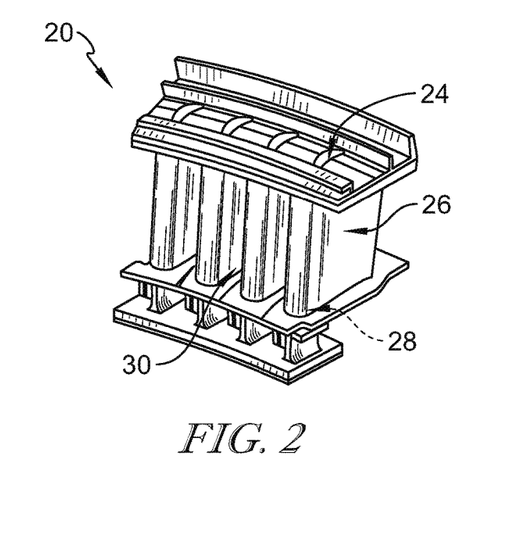
FIG. 2 is a perspective view of a portion of one of the turbine vane assemblies included in the gas turbine engine of FIG. 1 suggesting that the turbine vane assembly includes metallic support struts and ceramic matrix composite vanes that shield the metallic support struts from hot gas that moves through a primary gas path of the turbine vane assembly.

A turbine vane assembly 20 according to the present disclosure is adapted for use in a gas turbine engine 10 as suggested in FIGS. 1 and 2. The gas turbine engine 10 includes a fan 12, a compressor 14, a combustor 16, and a turbine 18. The fan 12 generates thrust for propelling an aircraft. The compressor 14 compresses and delivers air to the combustor 16. The combustor 16 mixes fuel with the compressed air received from the compressor 14 and ignites the fuel. The hot, high-pressure gases from the burning fuel are directed into the turbine 18 where the turbine 18 extracts work from the gases to drive the compressor 14 and the fan 12. In other embodiments, the gas turbine engine 10 may include a shaft, turboprop, or gearbox in place of the fan 12.

The turbine 18 includes a plurality of turbine vane assemblies 20 and turbine wheel assemblies 22 as shown in FIG. 1. A portion of one of the turbine vane assemblies 20 is shown in FIG. 2. The turbine vane assembly 20 extends partway about an axis 11 of the gas turbine engine 10 and is located between turbine wheel assemblies 22 to direct gases received from an upstream turbine wheel assembly 22 toward a downstream turbine wheel assembly 22. Each turbine wheel assembly 22 is configured to interact with the hot combustion gases from the combustor 16 and rotate about the axis 11 of the gas turbine engine 10 to generate power for driving the compressor 14 and/or the fan 12.

Figure 3:
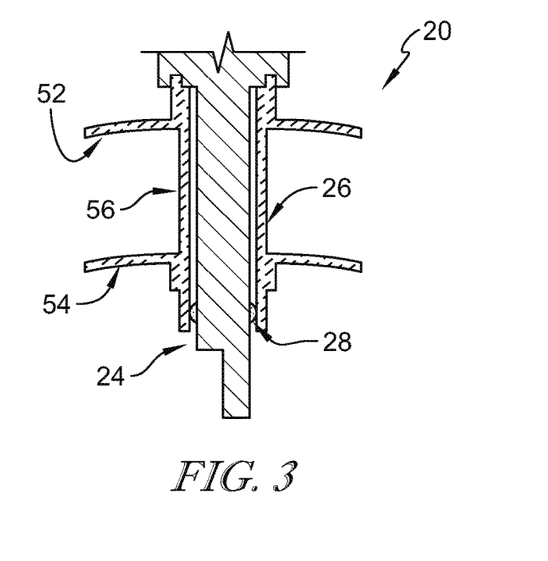
FIG. 3 is a diagrammatic and cross-sectional view of a portion of the turbine vane assembly of FIG. 2 showing that the turbine vane assembly includes the metallic support strut, the ceramic matrix composite vane, and a low-friction sleeve located between the support strut and the vane to allow the vane to slide relative to the support strut in response to relative thermal growth between the components of the turbine vane assembly during operation of the gas turbine engine.
Figure 4:
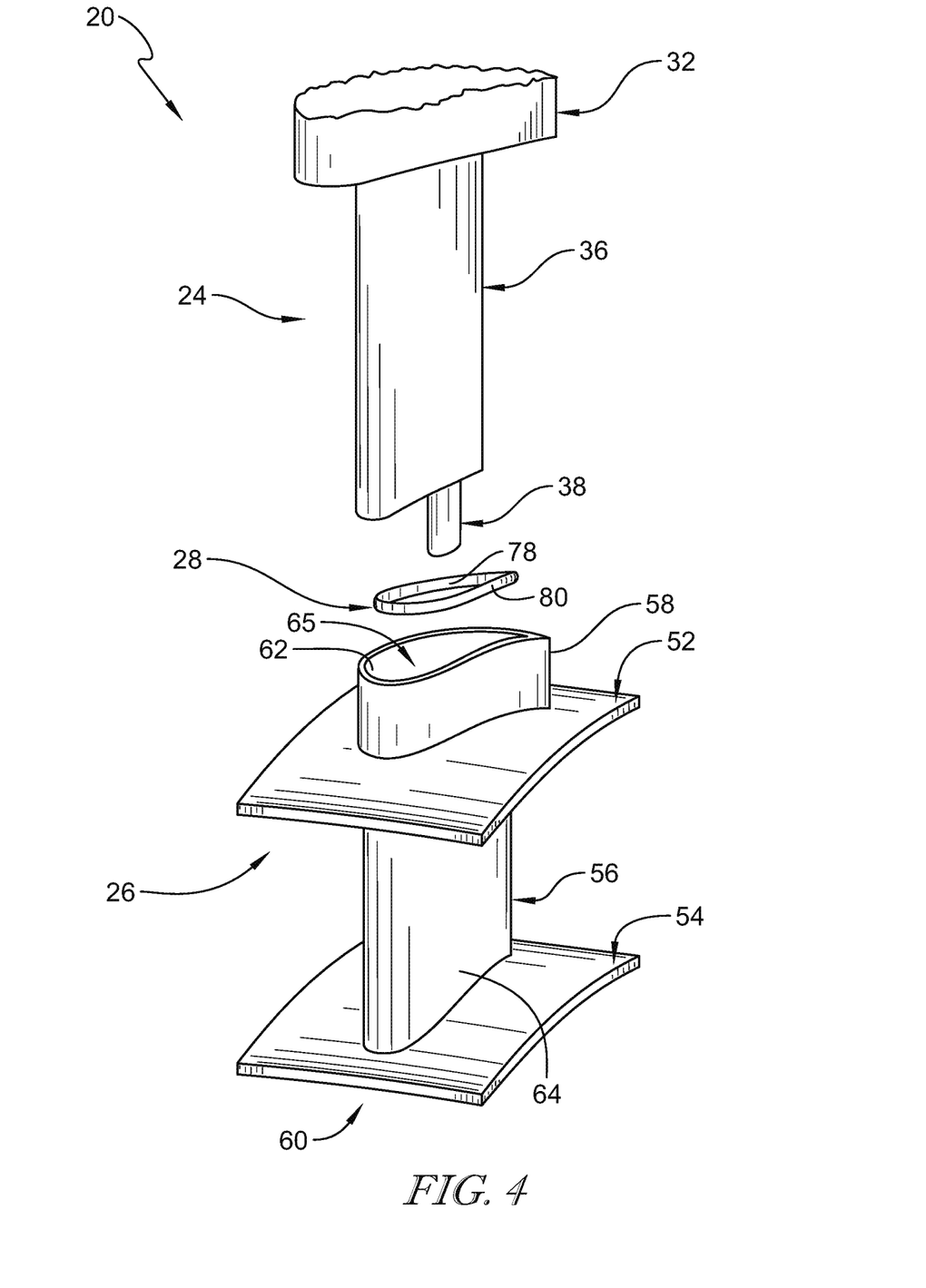
FIG. 4 is an exploded view of the turbine vane assembly of FIG. 3 showing the metallic support strut, the ceramic matrix composite vane adapted to receive the metallic support strut in an interior region of the vane, and the low-friction sleeve adapted to extend around the metallic support strut.
Figure 5:
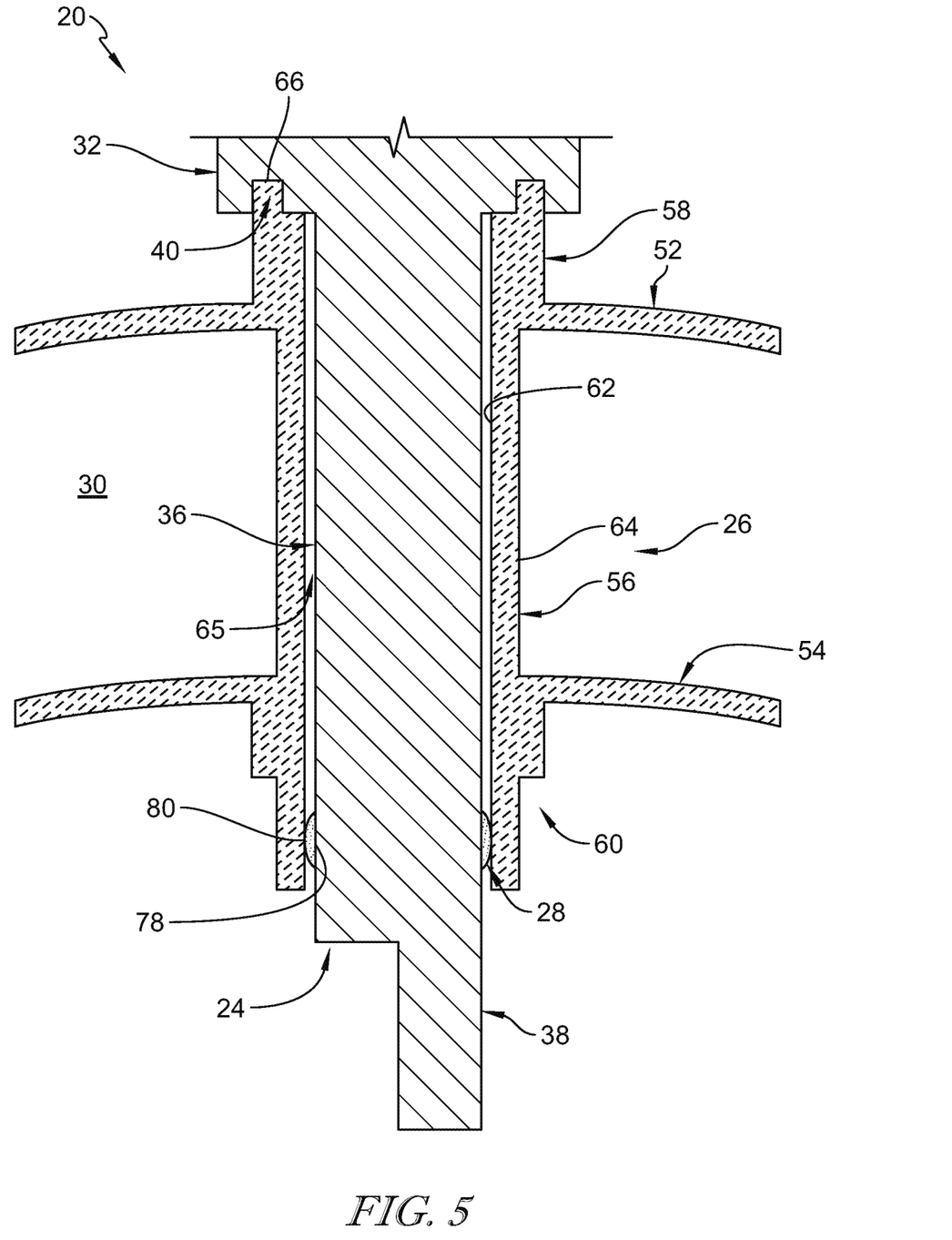
FIG. 5 is a view similar to FIG. 3 showing that the low-friction sleeve is coupled to the support strut and engages directly with an inner surface of the vane to transmit force loads acting on the vane to the support strut while also allowing the inner surface of the vane to slide continuously and radially relative to the support strut.

The turbine vane assembly 20 includes a support strut 24, a vane 26, and a sleeve 28 as shown in FIGS. 3-5. The support strut 24 provides structural support for the turbine vane assembly 20 and may be mounted in a ring or to a turbine case of the turbine. The vane 26 defines a primary gas path 30 adapted to conduct hot gases through the turbine vane assembly 20 during use of the turbine vane assembly 20. The vane 26 insulates the support strut 24 from the hot gases in the primary gas path 30. The sleeve 28 is located between the support strut 24 and the vane 26 and is made to be low-friction to allow the vane 26 to slide relative to the support strut 24 in response to thermal growth mismatch between the vane 26 and the support strut 24 caused by different coefficients of thermal expansion of the vane 26 and the support strut 24 during use of the turbine vane assembly 20. The sleeve further transmits force loads acting on the vane 26 to the support strut 24.

The support strut 24 includes an outer mount panel 32, a spar 36, and a mount extension 38 as shown in FIG. 4. Portions of the outer mount panel 32 are broken away to show only the radial inner portion of the outer mount panel 32. The outer mount panel 32 is configured to couple the turbine vane assembly 20 with a casing of the turbine 18 for movement with the casing and to transmit loads acting on the turbine vane assembly to the casing. The spar 36 extends radially-inwardly from the outer mount panel 32 relative to the axis 11. In some embodiments, the spar 36 may be hollow with one or more cooling air impingement holes to allow cooling air from a secondary air system to flow through the spar 36 and cool the ceramic matrix composite material. The spar 36 may also transit flow to feed other cavities with cooling air. The mount extension 38 extends radially-inwardly from the spar 36 relative to the axis 11. In some embodiments, the mount extension 38 may be mounted an inner seal. illustratively, the support strut 24 is made of metallic materials.

In illustrative embodiments, the outer mount panel 32 is formed to define a vane receiver 40 that extends radially outward into the outer mount panel 32 as shown in FIG. 5. The vane receiver 40 receives a portion of the vane 26 to cause the vane 26 to engage the outer mount panel 32 and transmit circumferential and axial loads applied to the vane 26 to the support strut 24 at a radial outer end of the vane 26 outside of the primary gas path 30 where the temperature of the turbine vane assembly 20 may be lower.

The vane 26 includes an outer end wall 52, an inner end wall 54 spaced apart radially from the outer end wall 52 relative to the axis 11, and an airfoil 56 as shown in FIGS. 4 and 5. The airfoil 56 extends radially between and interconnects the outer end wall 52 and the inner end wall 54. The outer end wall 52 defines a radially outer boundary of the primary gas path 30 and the inner end wall 54 defines a radially inner boundary of the primary gas path 30. The outer end wall 52 shields the outer mount panel 32 of the support strut 24 from the primary gas path 30. The airfoil 56 is shaped to redirect air flowing through the gas turbine engine 10 and shield the support strut 24 from the primary gas path 30.

The airfoil 56 includes a radial outer end 58, a radial inner end 60, an inner surface 62, and an outer surface 64 as shown in FIGS. 4 and 5. The radial inner end 60 is spaced apart radially from the radial outer end 58 relative to the axis 11 and extends radially-inwardly past the inner end wall 54 outside of the primary gas path 30 in the illustrative embodiment. The radial outer end 58 extends radially-outwardly past the outer end wall 52 outside of the primary gas path 30. The inner surface 62 of the airfoil 56 defines a cavity 65 that receives the spar 36 of the support strut 24. The outer surface 64 is spaced apart from the inner surface 62 facing away from the cavity 65 and toward the primary gas path 30. The inner surface 62 is spaced apart from the spar 36 to form a gap therebetween.

The radial outer end 58 of the airfoil 56 is shaped to form a load transfer tab 66 in the illustrative embodiment as shown in FIG. 5. The load transfer tab 66 extends into the vane receiver 40 formed in the support strut 24 to transfer loads applied to the vane 26 to the support strut 24 at the radial outer end 58 of the airfoil 56. In other embodiments, the radial inner end 60 of the airfoil 56 is shaped to form the load transfer tab 66 as shown, for example, in FIG. 9. In some embodiments, one or more seals are located between the airfoil 56 and the spar 36.

In illustrative embodiments, the vane 26 is made entirely from ceramic matrix composite materials. In the illustrative embodiment, the outer end wall 52, the inner end wall 54, and the airfoil 56 of the vane 26 are integrally formed from ceramic matrix composite materials such that the outer end wall 52, the inner end wall 54, and the airfoil 56 are a single, one-piece, integral vane component 26. In other embodiments, the outer end wall 52, inner end wall 54, and the airfoil 56 are formed as separate components. The vane 26 has a first coefficient of thermal expansion and the support strut 24 has a second coefficient of thermal expansion different than the first coefficient of thermal expansion.

Figure 15:
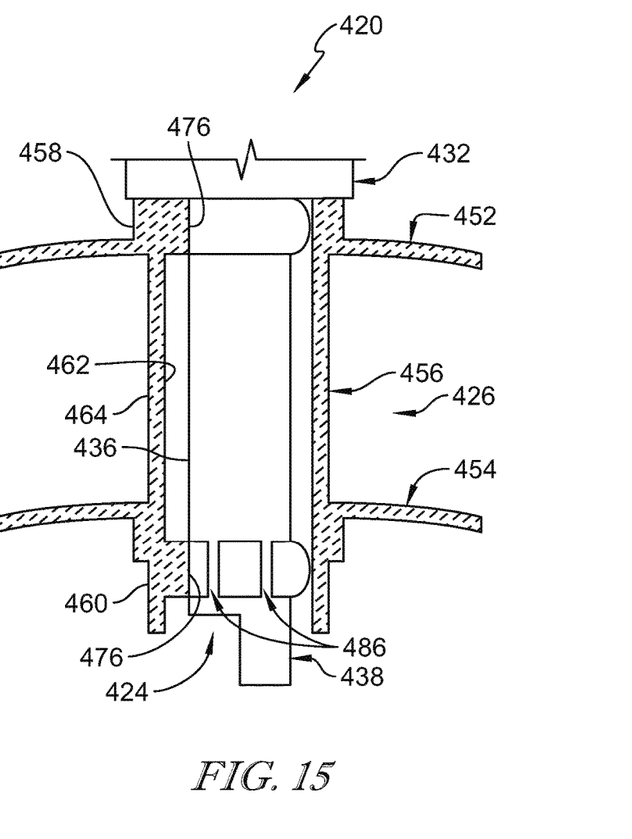
FIG. 15 is a diagrammatic and cross-sectional view of the turbine vane assembly of FIG. 14 showing that an airfoil of the vane includes the anti-rotation tab that extends from the inner surface of the airfoil into the cutout formed in the radial outer sleeve to block rotation of the vane relative to the support strut.

The sleeve 28 is located between the spar 36 of the support strut 24 and the airfoil 56 of the vane 26 to allow the vane 26 to slide relative to the support strut 24 during use of the turbine vane assembly 20 as suggested in FIG. 5. In the illustrative embodiment, the sleeve 28 allows the inner surface 62 of the airfoil 56 to slide continuously and radially relative to the spar 36 in response to relative thermal growth between the support strut 24 and the vane 26 during use of the turbine vane assembly 20. The sleeve 28 is continuous airfoil shaped when viewed radially relative to the axis 11 in the embodiment shown in FIGS. 4 and 5. In other embodiments, the sleeve 28 may be shaped as per the inner shape of the airfoil 56 or any other suitable alternative shape. In other embodiments, the sleeve 28 may be formed to include cutouts. In some embodiments, the sleeve 28 is formed from a plurality of discrete sleeve pieces as shown in FIG. 15. The inner surface 62 of the airfoil 56 is continuous to allow sliding movement along the sleeve 28.

Figure 13:
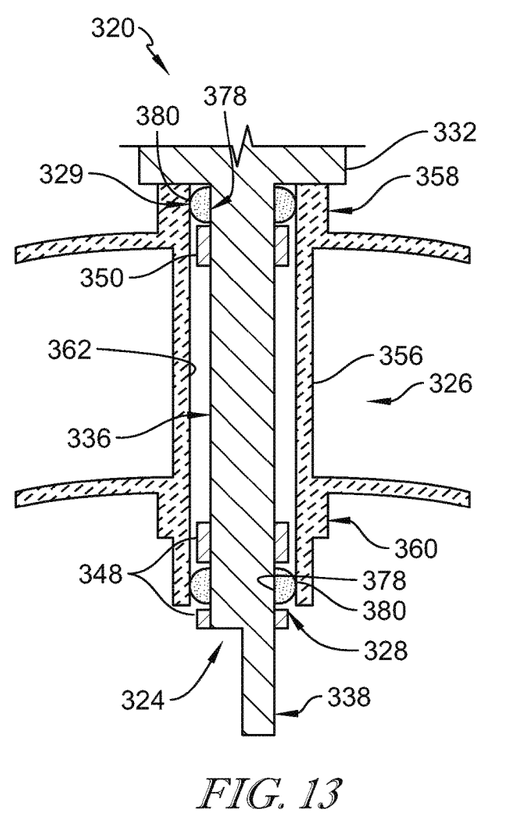
FIG. 13 is a diagrammatic and cross-sectional view of the turbine vane assembly of FIG. 12 showing that one sleeve is located at a radial inner end of an airfoil of the vane and another sleeve is located at a radial outer end of the airfoil of the vane.

The sleeve 28 is rigid (non-compliant) and directly engages the inner surface 62 of the airfoil 56 that faces the spar 36 to transmit force loads acting on the airfoil 56 to the spar 36. The rigid sleeve 28 may therefore be determinate and loading on the sleeve 28 may be predetermined. In some embodiments, the sleeve 28 is located radially at the radial inner end 60 of the airfoil 56. In other embodiments, the low-friction sleeve 28 transmits loads acting on the airfoil 56 to the spar 36 at the radial outer end 58 of the airfoil 56 as shown, for example, in FIG. 9. In some embodiments, the turbine vane assembly 20 includes a plurality of sleeves 28 as shown in FIG. 13.

The sleeve 28 includes an attachment surface 78 and a contact surface 80 as shown in FIGS. 4 and 5. The attachment surface 78 is coupled with the spar 36 and is shaped to match the profile of the spar 36 in the illustrative embodiment. The contact surface 80 engages the inner surface 62 of the airfoil 56. The contact surface 80 may engage directly the inner surface 62 of the airfoil 56. In the illustrative embodiment, the contact surface 80 of the sleeve 28 is convex. The convex shape of the contact surface 80 of the sleeve 28 allows the sleeve to transmit loads acting on the airfoil 56 to the spar 36 while also allowing the vane 26 to slide relative to the support strut 24 in response to thermal growth between the support strut 24 and the vane 26 during use of the turbine vane assembly 20.

Figure 7:
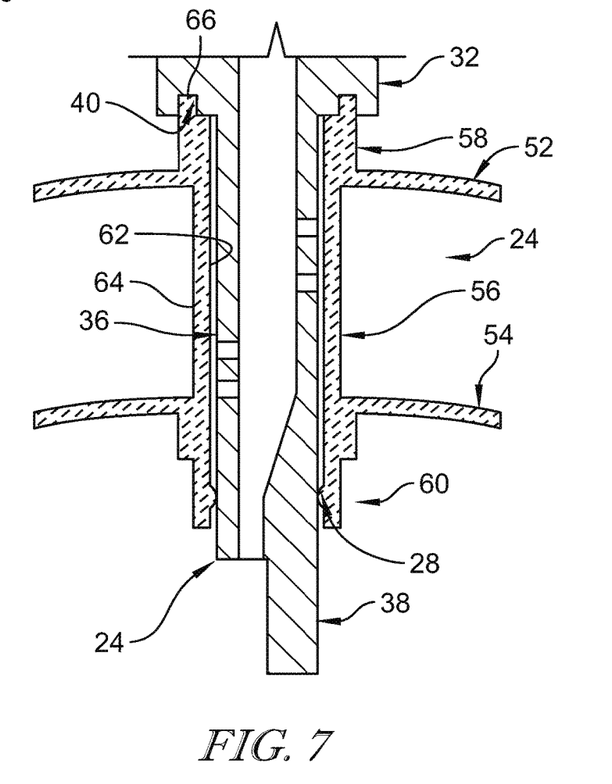
FIG. 7 is a diagrammatic and cross-sectional view of another embodiment the turbine vane assembly of FIG. 2 showing that the turbine vane assembly includes a support strut, a vane, and a sleeve integrally formed with the vane.
Figure 8:
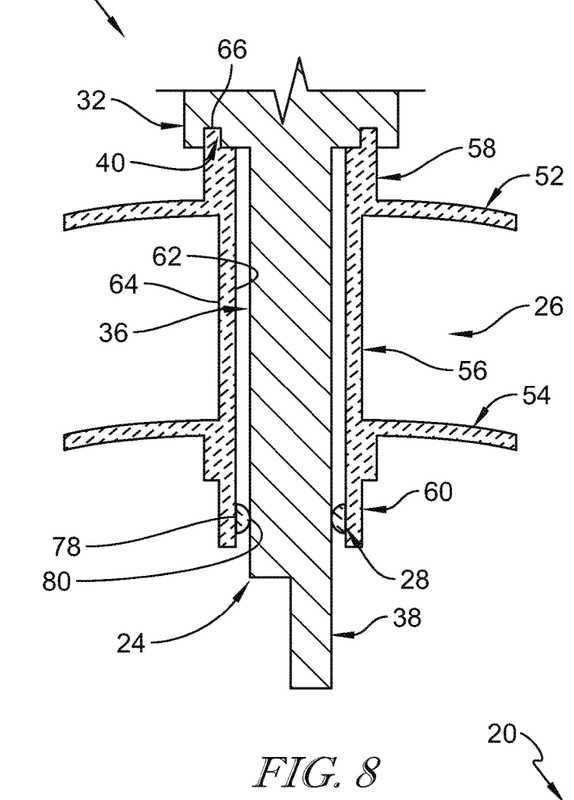
FIG. 8 is a diagrammatic and cross-sectional view of another embodiment the turbine vane assembly of FIG. 2 showing that the turbine vane assembly includes a support strut, a vane, and a sleeve that is coupled with the vane for movement with the vane relative to the support strut.

In other embodiments, the attachment surface 82 is coupled with the inner surface 62 of the airfoil 56 and is shaped to match the profile of the inner surface of the airfoil 56 as shown in FIGS. 7 and 8. In such embodiments, the contact surface 84 engages the spar 36 and is convex to encourage sliding while enabling load transfer.

In the illustrative embodiment, the sleeve 28 is made of silicon nitride and coupled to a spar 36 of the support strut 24 for movement therewith as shown in FIG. 5. In other embodiments, the low-friction sleeve 28 is made of other low-friction, high-temperature capable materials such as, for example, PM121, Ni3Al, or materials that naturally form lubricating oxide layers such as Ni—Cu—Re or Co—Cu—Re. Additionally, in other embodiments, the low-friction sleeve 28 may be made of metallic materials with a low-friction, diffusion barrier coating. The low-friction material of the sleeve 28 allows the vane 26 to slide relative to the support strut 24. The sleeve 28 may be brazed, bonded, or integrally formed with the spar 36 or airfoil 56 or may be coupled therewith by any other suitable alternative. In some embodiments, the sleeve 28 includes a body and an outer diffusion barrier coat adhered to the body.

The contact surface 80 of the sleeve 28 is polished in some embodiments to provide the relatively low-friction surface for sliding. In some embodiments, the inner surface 62 of the airfoil 56 is polished in some embodiments to provide a relatively low-friction surface for sliding. In some embodiments, the inner surface 62 of the airfoil 56 includes a coating to provide a relatively low-friction surface for sliding. The contact surface 80 of the sleeve 28 may have a surface roughness of about 0.80 μm (micrometer) Ra. In some embodiments, the contact surface 80 has a roughness of at least about 1.6 μm (micrometer) Ra or less. In some embodiments, the contact surface 80 of the sleeve 28 has a surface roughness of about 2 μm (micrometer) Ra or less. The contact surface 80 of the sleeve 28 may have a surface hardness of about 70 HRC to 100 HRC. In some embodiments, the contact surface 80 of the sleeve 28 may have a surface hardness of between about 75 HRC and about 95 HRC. In some embodiments, the contact surface 80 of the sleeve 28 may have a surface hardness of between about 80 HRC and about 90 HRC. In some embodiments, the contact surface 80 of the sleeve 28 may have a surface hardness of about 78 HRC. In some embodiments, the contact surface 80 of the sleeve 28 may have a surface hardness of about 90 HRC.

In other embodiments, the sleeve 28 may be made from ceramic matrix composite material. The ceramic matrix material may then be machined to a much improved or desired roughness value and/or coated with an environmental barrier coating.

During operation of the gas turbine engine 10, the support strut 24 and the vane 26 are heated from the gases in the gas path 30. The support strut 24 and the vane 26 grow radially relative to one another due to their different coefficients of thermal expansion. The sleeve 28 provides a relative low-friction surface (as compared to the surface of the spar 36 or a seal) to allow the vane 26 to freely translate radially relative to the support strut 24 to reduce stresses acting on the ceramic matrix composite vane 26. Additionally, the sleeve 28 is rigid and transmits loads acting on the vane 26 to the support strut 24.

At engine overhaul, the sleeve 28 may be replaced while the original spar 36 and vane 26 are reused in the engine 10. In other instances, the entire assembly 20 may be replaced.

In the illustrative embodiment shown in FIG. 5, the radial outer end 58 of the airfoil 56 is engaged with the outer mount panel 32 of the support strut 24. As a result, the spar 36 may grow (slide or translate) radially inward relative to airfoil 56 to cause the sleeve 28 to slide along the airfoil 56. In any case, it can be considered that relative movement is made between the vane 26 and the support strut 24 due to thermal growth of the components.

Figure 6:
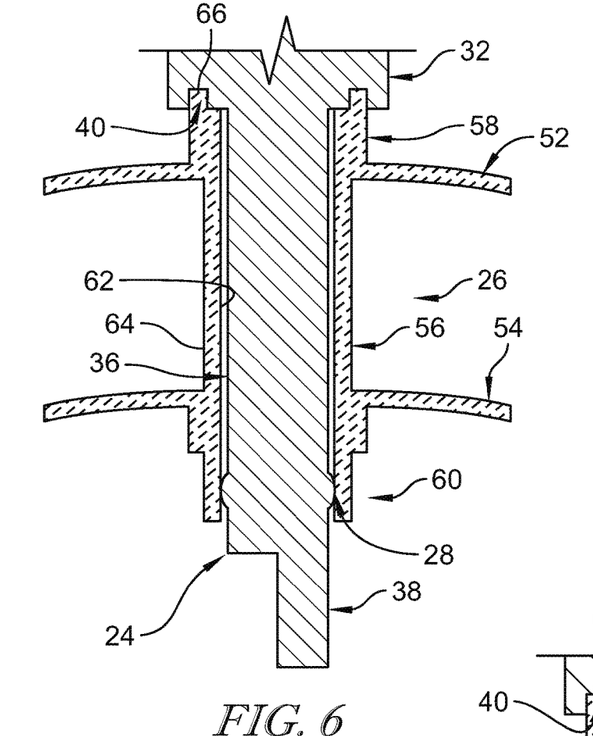
FIG. 6 is a diagrammatic and cross-sectional view of another embodiment the turbine vane assembly of FIG. 2 showing that the turbine vane assembly includes a support strut, a vane, and a sleeve integrally formed with the support strut.

In some embodiments, the sleeve 28 and the support strut 24 are integrally formed as a single, one-piece, unitary component as shown in FIG. 6. In other embodiments, the low-friction sleeve 28 and the vane 26 are integrally formed as a single, one-piece, unitary component as shown in FIG. 7. In another embodiment, the low-friction sleeve 28 is made of ceramic matrix composite materials and coupled to the inner surface 62 of the vane 26 as shown in FIG. 8.

Figure 9:
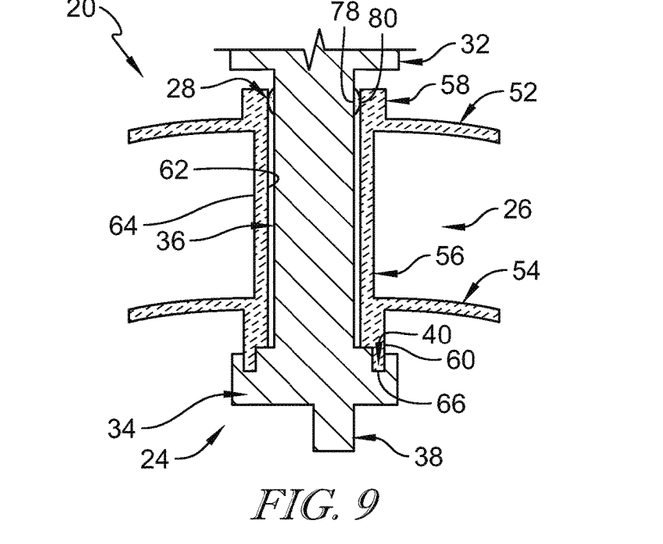
FIG. 9 is a diagrammatic and cross-sectional view of another embodiment the turbine vane assembly of FIG. 2 showing that the turbine vane assembly includes a support strut, a vane, and a sleeve located at a radial outer end of the vane and that the support strut includes a radial inner mount panel to transfer load from the vane to the support strut at a radial inner end of the vane.

In some embodiments, the support strut 24 further includes an inner mount panel 34 as shown in FIG. 9. The inner mount panel 34 is spaced apart radially from the outer mount panel 32. The spar 36 extends between and interconnects the inner mount panel 34 and the outer mount panel 32. In the embodiment of FIG. 9, the inner mount panel 34 is shaped to include the load vane receiver 40. The vane receiver 40 is formed in a radial inward side of the inner mount panel 34 outside of the primary gas path 30. In such an embodiment, the radial outer end 58 of the airfoil 56 may be spaced apart from the outer mount panel 32. The sleeve 28 is located at the radial outer end 58 of the airfoil 56.

Figure 10:
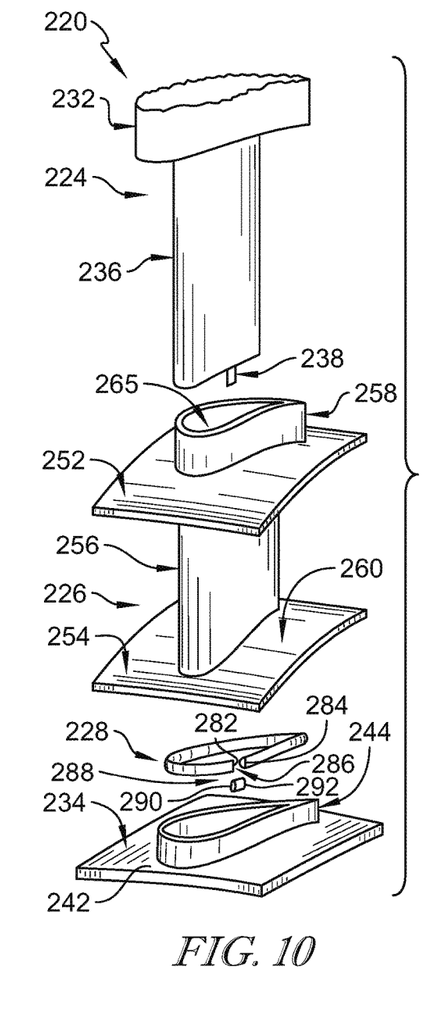
FIG. 10 is an exploded view of another turbine vane assembly in accordance with the present disclosure showing that the turbine vane assembly includes a support strut, a vane, and a sleeve coupled with the support strut and located between the support strut and the vane to allow the vane to slide relative to the support strut and showing that the low-friction sleeve defines a cutout that receives an anti-rotation tab of the vane to block rotation of the vane relative to the support strut.
Figure 11:
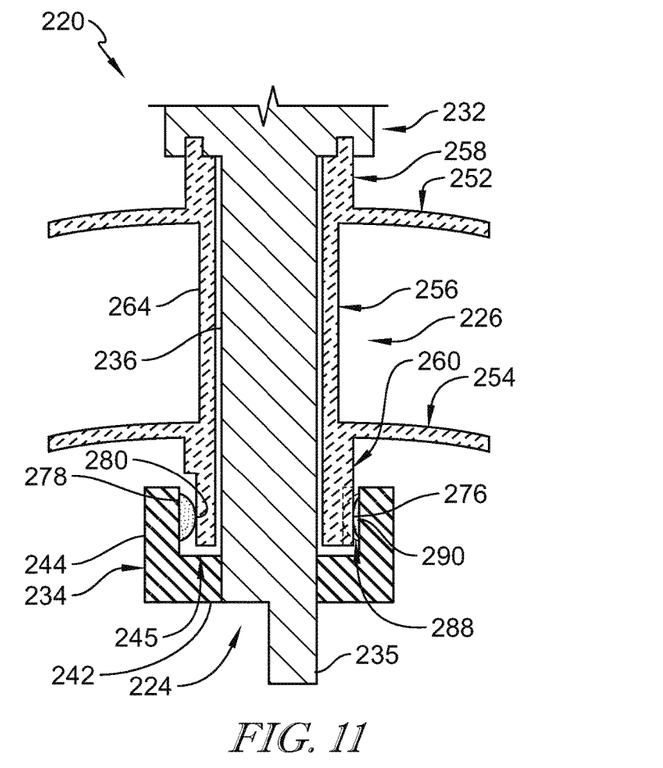
FIG. 11 is a diagrammatic and cross-sectional view of the turbine vane assembly of FIG. 10 showing that the low-friction sleeve is coupled to an inner mount panel of the support strut and engages directly with an outer surface of the vane to transmit force loads acting on the vane to the support strut.

Another embodiment of a turbine vane assembly 220 in accordance with the present disclosure is shown in FIGS. 10 and 11. The turbine vane assembly 220 is substantially similar to the turbine vane assembly 20 shown in FIGS. 1-5 and described herein. Accordingly, similar reference numbers in the 200 series indicate features that are common between the turbine vane assembly 20 and the turbine vane assembly 220. The description of the turbine vane assembly 20 is incorporated by reference to apply to the turbine vane assembly 220, except in instances when it conflicts with the specific description and the drawings of the turbine vane assembly 220.

The turbine vane assembly 220 includes a support strut 224, a vane 226, and a sleeve 228 as shown in FIGS. 10 and 11. The support strut 224 includes an outer mount panel 232, an inner mount panel 234, a spar 236, and a mount extension 238 as shown in FIGS. 10 and 11. The inner mount panel 234 is spaced apart radially from the outer mount panel 232. The spar 236 extends radially between the outer mount panel 232 and the inner mount panel 234. The mount extension 238 extends radially-inwardly from the spar 236 relative to the axis 11.

The inner mount panel 234 includes a panel 242 and a rim 244 as shown in FIGS. 10 and 11. The rim 244 extends radially-inwardly away from the panel 242 relative to the axis 11 to define a channel 245 between an inner surface of the rim 244 and the outer surface of the spar 236. In the illustrative embodiment, the rim 244 is airfoil shaped.

The vane 226 includes an outer end wall 252, an inner end wall 254, and an airfoil 256 as shown in FIGS. 10 and 11. The airfoil 256 includes a radial outer end 258 and a radial inner end 260. The radial inner end 260 is spaced apart radially from the radial outer end 258. The radial inner end 260 of the airfoil 256 extends radially-inwardly past the inner end wall 254 outside of the primary gas path 30 into the channel 245 formed by the inner mount panel 234 to be engaged by the sleeve 228. The radial outer end 258 extends radially-outwardly past the outer end wall 252 outside of the primary gas path 30.

The radial inner end 260 is shaped to include an anti-rotation tab 276 as shown in FIG. 11. The anti-rotation tab 276 extends away from an outer surface 264 of the airfoil 256 toward the rim 244 of the support strut 224. The anti-rotation tab 276 extends into a cutout 286 formed in the low-friction sleeve 228 to block rotation of the vane 226 relative to the support strut 224.

The low-friction sleeve 228 is located between the rim 244 of the inner mount panel 234 of the support strut 224 and the airfoil 256 of the vane 226 in the channel 245 to allow the vane 226 to slide relative to the support strut 224. The sleeve 228 is rigid and engages the outer surface 264 of the airfoil 256 that faces the rim 244 of the inner mount panel 234 to transmit force loads acting on the airfoil 256 to the support strut 224 at the radial inner end 260 of the airfoil 256. The sleeve 228 allows the outer surface 264 of the airfoil 256 to slide continuously and radially relative to the support strut 224 in response to relative thermal growth between the support strut 224 and the vane 226 during use of the turbine vane assembly 220.

Figure 12:
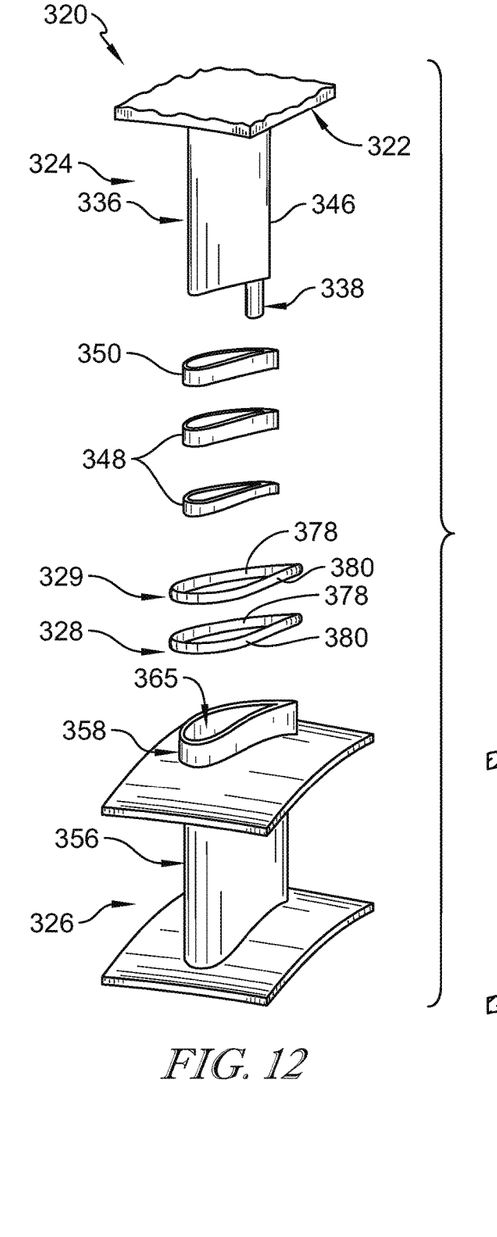
FIG. 12 is an exploded view of another turbine vane assembly in accordance with the present disclosure showing that the turbine vane assembly includes a support strut, a vane, and a plurality of sleeves to allow the vane to slide relative to the support strut and suggesting that a spar of the support strut includes retainer bands that block radial movement of the sleeve relative to the spar.

The low-friction sleeve 228 includes a body that has an attachment surface 278, a contact surface 280, a first end 282, and a second end 284 as shown in FIGS. 11 and 12. The attachment surface 278 is coupled with the inner surface of the rim 244 and is shaped to match the profile of the rim 244. The contact surface 280 engages directly the outer surface 264 of the airfoil 256. In the illustrative embodiment, the contact surface 280 of the body of the sleeve 228 is convex. The convex shape of the contact surface 280 of the sleeve 228 allows the sleeve to transmit loads acting on the airfoil 256 to the spar 236 while also allowing the vane 226 to slide relative to the support strut 224 in response to thermal growth between the support strut 224 and the vane 226 during use of the turbine vane assembly 220. The second end 284 is spaced apart from the first end 282 to define a cutout 286 that extends radially through the sleeve 228.

In the illustrative embodiment, the sleeve 228 further includes a separate insert 288 as shown in FIGS. 10 and 11. The insert 288 is located in the cutout 286 of the body of the sleeve 228 and engages the anti-rotation tab 276 of the radial inner end 260 of the airfoil 256. The insert has a smaller thickness than the portion of the sleeve 28 that extends between the first and second ends 282, 284 so that it fits between the inner mount panel 234 and the anti-rotation tab 276.

The insert 288 is shaped to include an attachment surface 290 and a contact surface 292 as shown in FIGS. 10 and 11. The attachment surface 290 is coupled with the inner surface of the rim 244 and is shaped to match the profile of the rim 244. The contact surface 292 engages the outer surface 264 of the airfoil 256 at the anti-rotation tab 276. In the illustrative embodiment, the contact surface 292 of the sleeve 228 is convex. The curvature of the convex contact surface 292 of the rib 288 is less than the curvature of the contact surface 280.

Another embodiment of a turbine vane assembly 320 in accordance with the present disclosure is shown in FIGS. 12 and 13. The turbine vane assembly 320 is substantially similar to the turbine vane assembly 20 shown in FIGS. 1-5 and described herein. Accordingly, similar reference numbers in the 300 series indicate features that are common between the turbine vane assembly 20 and the turbine vane assembly 320. The description of the turbine vane assembly 20 is incorporated by reference to apply to the turbine vane assembly 320, except in instances when it conflicts with the specific description and the drawings of the turbine vane assembly 320.

The turbine vane assembly 320 includes a support strut 324, a vane 326, and a plurality of sleeves 328 as shown in FIGS. 12 and 13. The support strut 324 includes an outer mount panel 332, a spar 336, and a mount extension 338. The spar 336 extends radially-inwardly from the outer mount panel 332 relative to the axis 11. The mount extension 338 extends radially-inwardly from the spar 336 relative to the axis 11.

The spar 336 includes a body 346, inner retainer bands 348, and an outer retainer band 350 as shown in FIGS. 12 and 13. The inner retainer bands 348 are located at a radial inner end of the spar 336. The outer retainer band 350 is spaced apart from the inner retainer bands 348 at an opposite end of the spar 336. The inner and outer retainer bands 348, 350 extend away from the body 346 to block radial movement of the sleeve 328, 329 relative to the body 346 of the spar 336.

In the illustrative embodiment, the retainer bands 348, 350 are formed separately from the spar 336 and rigidly attached to the body 346 of the spar 336 through i.e. welding, brazing, or any other suitable retention approach. In other embodiments, the retainer bands 348, 350 are integrally formed with the body 346 of the spar 336.

The plurality of sleeves 328, 329 include an inner sleeve 328 and an outer sleeve 329 as shown in FIGS. 12 and 13. The inner sleeve 328 is located between the spar 336 of the support strut 324 and an airfoil 356 of the vane 326 at a radial inner end 360 of the airfoil 356. The outer sleeve 329 is located between the spar 336 and the airfoil 356 of the vane 326 at a radial outer end 358 of the airfoil 356. The inner and outer sleeves 328, 329 allow the vane 326 to slide relative to the support strut 324. The sleeves 328, 329 are rigid and engage an inner surface 362 of the airfoil 356 that faces the spar 336 to transmit force loads acting on the airfoil 356 to the spar 336. The sleeves 328, 329 allow the inner surface 362 of the airfoil 356 to slide continuously and radially relative to the spar 336 in response to relative thermal growth between the support strut 324 and the vane 326 during use of the turbine vane assembly 320.

In the illustrative embodiment, the inner sleeve 328 is located between the inner retainer bands 348 of the spar 336. The outer sleeve 329 is located between the outer mount plate 332 and the outer retainer band 350. The sleeves 328, 329 are not coupled to the spar 336 and are retained in position by the bands 348, 350. In other embodiments, the sleeves 328, 329 are coupled with the spar 336 or airfoil 356.

Each of the sleeves 328, 329 include an attachment surface 378 and a contact surface 380 as shown in FIGS. 12 and 13. The attachment surface 378 is coupled with the spar 336. The contact surface 380 engages directly the inner surface 362 of the airfoil 356. In the illustrative embodiment, the contact surface 380 of the sleeves 328, 329 are convex. The convex shape of the contact surface 380 of the sleeve 328 allows the sleeve to transmit loads acting on the airfoil 356 to the spar 336 while also allowing the vane 326 to slide relative to the support strut 324 in response to thermal growth between the support strut 324 and the vane 326 during use of the turbine vane assembly 320.

Figure 14:
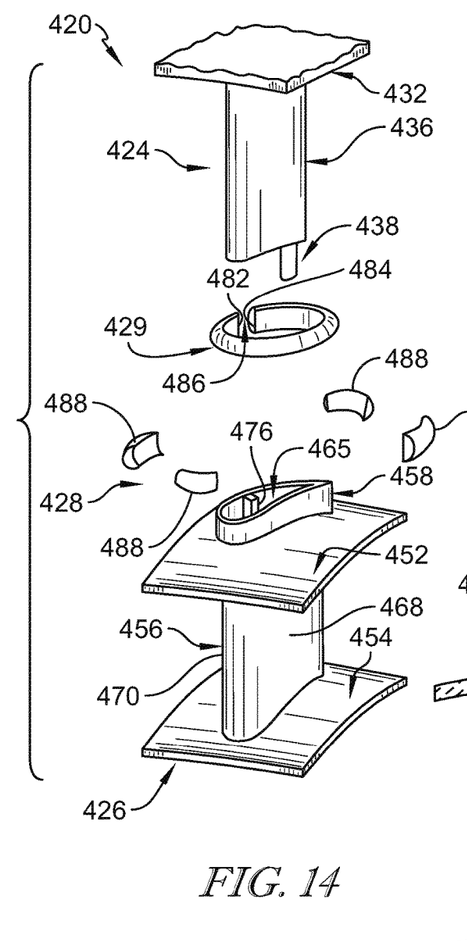
FIG. 14 is an exploded view of another turbine vane assembly in accordance with the present disclosure showing that the turbine vane assembly includes a support strut, a vane, and a multi-piece sleeve and a sleeve formed to include a cutout that receives an anti-rotation tab included in the vane.

Another embodiment of a turbine vane assembly 420 in accordance with the present disclosure is shown in FIGS. 14 and 15. The turbine vane assembly 420 is substantially similar to the turbine vane assembly 20 shown in FIGS. 1-5 and described herein. Accordingly, similar reference numbers in the 400 series indicate features that are common between the turbine vane assembly 20 and the turbine vane assembly 420. The description of the turbine vane assembly 20 is incorporated by reference to apply to the turbine vane assembly 420, except in instances when it conflicts with the specific description and the drawings of the turbine vane assembly 420.

The turbine vane assembly 420 includes a support strut 424, a vane 426, and a plurality of sleeves 428, 429 as shown in FIGS. 14 and 15. The support strut 424 includes an outer mount panel 432, a spar 436, and a mount extension 438. The spar 436 extends radially-inwardly from the outer mount panel 432 relative to the axis 11. The mount extension 438 extends radially-inwardly from the spar 436 relative to the axis 11.

The vane 426 includes an outer end wall 452, an inner end wall 454, and an airfoil 456 as shown in FIGS. 14 and 15. The airfoil 456 extends between and interconnects the outer end wall 452 and the inner end wall 454. The outer end wall 452 defines a radially outer boundary of the primary gas path 30 and the inner end wall 454 defines a radially inner boundary of the primary gas path 30. The outer end wall 452 shields the outer mount panel 432 of the support strut 424 from the primary gas path 30. The airfoil 456 is shaped to redirect air flowing through the gas turbine engine 10 and shield the spar 436 of the support strut 424 from the primary gas path 30.

The airfoil 456 includes a radial outer end 458, a radial inner end 460, an inner surface 462, and an outer surface 464 as shown in FIGS. 14 and 15. The radial inner end 460 is spaced apart radially from the radial outer end 458 and extends radially-inwardly past the inner end wall 454 outside of the primary gas path 30. The radial outer end 458 extends radially-outwardly past the outer end wall 452 outside of the primary gas path 30. The inner surface 462 of the airfoil 456 defines a cavity 465 that receives the spar 436 of the support strut 424. The outer surface 464 is spaced apart from the inner surface 462 facing away from the cavity 465 and toward the primary gas path 30.

The airfoil 456 further includes a pressure side wall 468, a suction side wall 470, and an anti-rotation tab 476 as shown in FIGS. 14 and 15. The pressure side wall 468 and a suction side wall 470 spaced apart circumferentially from the pressure side wall 468. The pressure side wall 468 and the suction side 470 extend axially between and interconnect a leading edge and a trailing edge of the airfoil 458. The anti-rotation tab 476 extends away from the suction side wall 470 toward the spar 436 in the illustrative embodiment. In other embodiments, the anti-rotation tab 476 may extend from the pressure side wall 468. In the illustrative embodiment, the airfoil 456 includes an inner and outer anti-rotation tabs 476 that extend from the suction side wall 470 at the radial outer and inner end 458, 460 of the airfoil 456.

The plurality of sleeves 428, 429 includes an inner sleeve 428 and an outer 429 sleeve as shown in FIGS. 14 and 15. The inner sleeve 428 is located between the spar 436 of the support strut 424 and the airfoil 456 of the vane 426 at the radial inner end 460 of the airfoil 456. The outer sleeve 429 is located between the spar 436 and the airfoil 456 of the vane 426 at the radial outer end 458 of the airfoil 456. The sleeves 428, 429 allow the vane 426 to slide relative to the support strut 424. The sleeves 428, 429 are rigid and engage an inner surface 462 of the airfoil 456 that faces the spar 436 to transmit force loads acting on the airfoil 456 to the spar 436. The sleeves 428, 429 allow the inner surface 462 of the airfoil 456 to slide continuously and radially relative to the spar 436 in response to relative thermal growth between the support strut 424 and the vane 426 during use of the turbine vane assembly 420.

Each of the sleeves 428, 429 includes an attachment surface 478 and a contact surface 480 as shown in FIGS. 14 and 15. The attachment surface 478 is coupled with the spar 436 of the support strut 424 and is shaped to match the profile of the spar 436. The contact surface 480 engages the outer surface 464 of the airfoil 456. In the illustrative embodiment, the contact surface 480 of the sleeve 428 is convex. The convex shape of the contact surface 480 of the sleeve 428 allows the sleeve to transmit loads acting on the airfoil 456 to the spar 436 while also allowing the vane 426 to slide relative to the support strut 424 in response to thermal growth between the support strut 424 and the vane 426 during use of the turbine vane assembly 420. In other embodiments, the sleeves 428, 429 are coupled with the airfoil 456.

The inner sleeve 428 includes a plurality of discrete ribs 488 as shown in FIGS. 14 and 15. Each of the plurality of ribs 488 is spaced apart from and aligned radially with a neighboring rib 488 included in the plurality of ribs 488. The ribs 488 are coupled with the spar 436 for movement therewith. Cutouts 486 are defined by the spaces between the ribs 488. The anti-rotation tab 476 of the airfoil 456 located at the radial inner end 460 of the airfoil 456 extends into one of the cutouts 486 defined between the ribs 488 to block rotation of the vane 426 relative to the support strut 424. The cutouts 486 defined between the ribs 488 may allow for cooling air to flow radially through the gap between the airfoil 456 and the spar 436.

The outer sleeve 429 includes a first end 482 and a second end 484 as shown in FIGS. 14 and 15. The second end 484 is spaced apart from the first end 482 to define a cutout 486 that extends radially through the sleeve 428. The anti-rotation tab 476 of the airfoil 456 located at the radial outer end 458 of the airfoil 456 extends into the cutout 486 defined in the sleeve 428 to block rotation of the vane 426 relative to the support strut 424.

Figure 16:
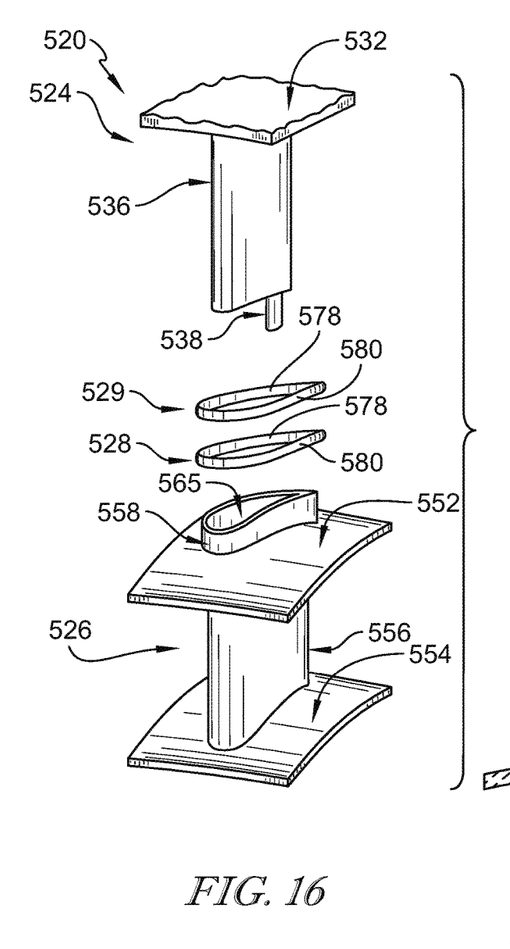
FIG. 16 is an exploded view of another embodiment of a turbine vane assembly in accordance with the present disclosure showing that the turbine vane assembly includes a support strut, a vane having a tapered end, and a plurality of sleeves to allow the vane to slide relative to the support strut and one of the sleeves engages the tapered end of the vane to limit radial movement of the vane in the radial inward direction.
Figure 17:
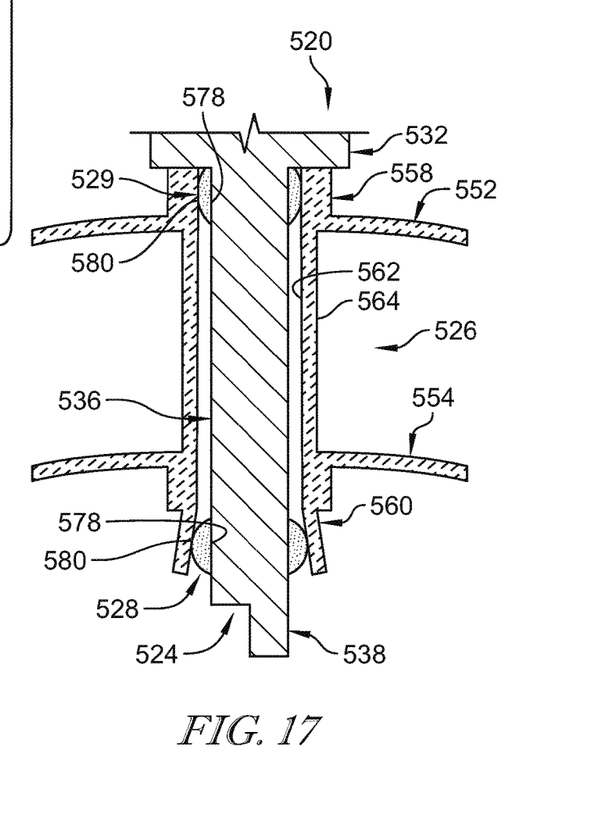
FIG. 17 is a diagrammatic and cross-sectional view of the turbine vane assembly of FIG. 16 showing that an airfoil of the vane includes a radial inner end that is tapered away from the support strut and showing that one of the sleeves engages the tapered radial inner end of the airfoil to transmit force loads acting on the airfoil to a spar of the support strut and to limit radial movement of the vane in the radial inward direction.

Another embodiment of a turbine vane assembly 520 in accordance with the present disclosure is shown in FIGS. 16 and 17. The turbine vane assembly 520 is substantially similar to the turbine vane assembly 20 shown in FIGS. 1-5 and described herein. Accordingly, similar reference numbers in the 500 series indicate features that are common between the turbine vane assembly 20 and the turbine vane assembly 520. The description of the turbine vane assembly 20 is incorporated by reference to apply to the turbine vane assembly 520, except in instances when it conflicts with the specific description and the drawings of the turbine vane assembly 520.

The turbine vane assembly 520 includes a support strut 524, a vane 526, and a plurality of sleeves 528, 529 as shown in FIGS. 16 and 17. The support strut 524 includes an outer mount panel 532, a spar 536, and a mount extension 538. The vane 526 includes an outer end wall 552, an inner end wall 554, and an airfoil 556 as shown in FIGS. 16 and 17. The airfoil 556 extends between and interconnects the outer end wall 552 and the inner end wall 554.

The airfoil 556 includes a radial outer end 558, a radial inner end 560, an inner surface 562, and an outer surface 564 as shown in FIGS. 16 and 17. The radial inner end 560 is spaced apart radially from the radial outer end 558 and extends radially-inwardly past the inner end wall 554 outside of the primary gas path 30. The radial outer end 558 extends radially-outwardly past the outer end wall 552 outside of the primary gas path 30. The inner surface 562 of the airfoil 556 defines a cavity 565 that receives a spar 536 of the support strut 524. The outer surface 564 is spaced apart from the inner surface 562 facing away from the cavity 565 and toward the primary gas path 30.

The radial inner end 560 is tapered away from the spar 536 in the illustrative embodiment. The tapered shape of the radial inner end 560 of the airfoil 556 pre-loads or compresses the ceramic matrix composite vane 526 at assembly which minimizes the tensile loading on the vane 526 during operation of the gas turbine engine 10. The tapered end may limit radial movement of the airfoil 556 relative to the spar 536 while allowing some radial sliding (translating) of the airfoil 556 relative to the spar 536.

The plurality of sleeves 528, 529 includes an inner sleeve 528 and an outer 529 sleeve as shown in FIGS. 16 and 17. The inner sleeve 528 is located between the spar 536 of the support strut 524 and the airfoil 556 of the vane 526 at the radial inner end 560 of the airfoil 556. The inner sleeve 528 engages the tapered inner end 560 of the airfoil 556. The outer sleeve 529 is located between the spar 536 and the airfoil 556 of the vane 526 at the radial outer end 558 of the airfoil 556. The sleeves 528, 529 allow the vane 526 to slide relative to the support strut 524. The sleeves 528, 529 are rigid and engage the inner surface 562 of the airfoil 556 that faces the spar 536 to transmit force loads acting on the airfoil 556 to the spar 536. The sleeves 528, 529 allow the inner surface 562 of the airfoil 556 to slide continuously and radially relative to the spar 536 in response to relative thermal growth between the support strut 524 and the vane 526 during use of the turbine vane assembly 520.

Each of the sleeves 528, 529 includes an attachment surface 578 and a contact surface 580 as shown in FIGS. 16 and 17. The attachment surface 578 is coupled with the spar 536 of the support strut 524 and is shaped to match the profile of the spar 536. The contact surface 580 engages directly the outer surface 564 of the airfoil 556. In the illustrative embodiment, the contact surface 580 of the sleeve 528 is convex. The convex shape of the contact surface 580 of the sleeve 528 allows the sleeve to transmit loads acting on the airfoil 556 to the spar 536 while also allowing the vane 526 to slide relative to the support strut 524 in response to thermal growth between the support strut 524 and the vane 526 during use of the turbine vane assembly 520. In other embodiments, the sleeves 528, 529 are coupled with the airfoil 556.

This present disclosure provides a turbine vane assembly that accounts for the relative thermal growth mismatch between a ceramic matrix composite airfoil and the metallic support structure through a low-friction sliding joint. In typical turbine vane assemblies, a spring or other compliant feature is used to account for the thermal growth mismatch.

The load from high pressure nozzle guide vanes is transmitted outboard to the high pressure turbine casing. In metallic embodiments, the nozzle guide vane structure is supported on hooks and/or rails attached to the outer platform. The hook and/or rail support structures provide a significant challenge for strain-limited structures manufactured from SiC/SiC ceramic matrix composite materials.

In the illustrative embodiments, the aerodynamic loading is transferred at both the inner and outer extents of the vane. The load would typically transmit through a metallic structure or spar out into the casing. However, the ceramic matrix composite material has a significantly lower coefficient of thermal expansion compared to the high temperature metals. As such, there is a significant mismatch in radial height between cold build and the hottest operating conditions.

The present disclosure aim to provide a solution to the alpha growth mismatch by employing a low-friction sliding contact at the load transfer feature. The aerodynamic load is transmitted through the contact while allowing radial growth. The aerodynamic load may be axial and/or circumferential. The sliding contact may be made with a silicon nitride sleeve attached to the metallic spar by brazing or other suitable attachment methods. Other low-friction, high-temperature capable materials such as PM212, Ni3Al, or materials that naturally form lubricating oxide layers such as Ni—Cu—Re or Co—Cu—Re may be used for the sliding contact. Silicon nitride is preferred due to the chemical compatibility with the SiC/SiC ceramic matrix composite material, but in lower temperature regions, metallic materials could have an optional low-friction, diffusion barrier coating.

In some embodiments, the material of the sleeve may have a roughness value, or Ra value, of about 0.80 μm, but should have a roughness value of at least 1.6 μm. The material of the sleeve may also have a higher hardness value to combat wear. For example, SiC is approximately 90 HRC and Si3N4 is approximately 78 HRC.

In the illustrative embodiments, a sliding contact is integrated onto the metallic spar and utilization of a compliant coating is used to protect the low strength ceramic matrix composite component. The sliding joint may be located at the inner platform as shown in FIGS. 5-8 or the outer platform as shown in FIG. 9. The sliding joint may be located at the outer platform if the net radial load on the ceramic matrix composite is inwards, rather than outwards. Alternatively, the sliding feature could be an integral part of the spar structure as shown in FIG. 6, rather than two separate features joined together. A single integral structure may alleviate concerns about the joint integrity, but would limit the choice of suitable spar materials.

In other embodiments, an inner platform engagement feature may be used to isolate the sliding joint from the ceramic matrix composite structure as shown in FIGS. 10 and 11. The inner platform engagement feature could be replaced at engine overhaul to prolong the usable life of the expensive ceramic matrix composite structure. The inner platform engagement feature may maximize the size of the metallic spar which is important to reduce stresses. The inner platform may also improve the assembly and durability of the configuration by fabricating the metallic support structure around the ceramic matrix composite vane which may help retain the ceramic matrix composite structure in case of failure of the primary load transfer features.

In the illustrative embodiment, the sliding feature is rigid and includes an anti-rotation feature, thus controlling the position and rotation of the ceramic matrix composite vane, which is beneficial as the temperature and stress in the ceramic matrix composite material is sensitive to the angle that the hot gas impinges on the airfoil. Additionally, controlling the position and rotation of the vane is also beneficial, as any rotation of the airfoil will affect the turbine throat area or capacity, which changes the engine performance. The action of the sliding feature is may be predictable, meaning the wear rate, deterioration, and life of the feature may have lower risk/less uncertainty as compared to a deformable sleeve.

In the illustrative embodiment, the sliding feature is spherically profiled to result in a more determinate transfer of loading. In other embodiments, the sliding feature may have other profiles such as an elongated rounded shape. The elongated rounded shape would minimize an increase in contact area with the ceramic matrix composite vane as the peak of the rounded shape wears away and therefore minimizing an increase in radial loading due to friction.

The spherically profiled sliding feature may be applied at both radial inner and outer arrangements as shown in FIGS. 12-17. In other embodiments, the sliding feature may be applied at both inner and outer arrangements within the airfoil structure itself like in FIG. 7. Applying the sliding feature within the airfoil simplifies the metallic support structure at the outer platform compared to the datum design which requires circumferential/axial and radial load transfer as shown in FIGS. 5-9. Providing the sliding feature at both inner and outer arrangements, when combined with a similar radial load transfer feature, may eliminate the ceramic matrix composite to metal interfaces with associated adverse chemical interactions.

In other embodiments, metallic retention features may be applied to the spar as shown in FIGS. 12 and 13. The metallic retention features would provide a redundant attachment approach or may even serve as the primary approach if assembled carefully.

In other embodiments, the low friction feature may be slotted as shown in FIGS. 14 and 15. The slots in the low friction feature allow the assembly to tolerate any coefficient of thermal expansion mismatches between the feature and the metallic spar.

As such, the sliding sleeve may not have a sealing functionality. For example, a slotted or discrete segment sleeve would allow flow to pass. In contrast a seal minimizes flow. The sliding sleeve may work only with relative small contact area with the ceramic matrix composite components. For example, the sleeve has at least two points of contact at the sliding end and three at the non-sliding. In contrast a seal generally maximizes the contact area with a ceramic matrix composite components.

In other embodiments, the sliding interface may be tapered as shown in FIGS. 16 and 17. The tapered interface biases the assembly. The taper also pre-loads or compresses the ceramic matrix composite structure at assembly to minimize the tensile loading when heated.

The present application may provide a method for attachment and load transfer between coefficients of thermal expansion mismatched structures. The present disclosure may provide an opportunity to avoid ceramic matrix composite and metallic interface with its associated adverse chemical interactions.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane assembly for a gas turbine engine, the turbine vane assembly comprising
a spar made of metallic materials and configured to couple the turbine vane assembly to a turbine case, the spar extends radially relative to an axis,
a vane made of ceramic matrix composite materials that defines a primary gas path adapted to conduct hot gases during use of the turbine vane assembly, the vane includes an outer end wall that defines an outer boundary of the primary gas path, an inner end wall spaced apart radially from the outer end wall to define an inner boundary of the primary gas path, and an airfoil that extends radially between and interconnects the outer end wall and the inner end wall and arranged around the spar to shield the spar from the gases in the primary gas path, and
a sleeve located between the spar and the airfoil to facilitate radial sliding of the vane relative to the spar during use of the turbine vane assembly, the sleeve coupled to the spar for movement with the spar, the sleeve being rigid and engaged with an inner surface of the airfoil to transmit force loads acting on the airfoil to the spar and to allow the inner surface of the airfoil to slide continuously and radially relative to the spar in response to relative thermal growth between the spar and the vane during use of the turbine vane assembly,
wherein the sleeve includes an attachment surface coupled with an outer surface of the spar and a contact surface that engages the inner surface of the airfoil, the attachment surface is shaped to match a contour of the outer surface of the spar such that the attachment surface continuously engages the outer surface of the spar as the attachment surface extends around the spar, and the contact surface is convex so as to provide a determinate load transfer point between the spar and the vane while minimizing a contact area with the vane to reduce radial loading due to friction which allows the vane to slide relative to the spar.

2. The turbine vane assembly of claim 1, wherein the sleeve is made of silicon nitride.

3. The turbine vane assembly of claim 1, wherein the sleeve includes a first end and a second end spaced apart from the first end to define a cutout that extends radially entirely through the sleeve.

4. The turbine vane assembly of claim 3, wherein the airfoil includes a side wall and an anti-rotation tab that extends away from the side wall toward the spar and into the cutout defined in the sleeve to block rotation of the vane relative to the spar.

5. The turbine vane assembly of claim 4, wherein the sleeve includes a plurality of discrete ribs and each of the plurality of discrete ribs is spaced apart from and aligned radially with a neighboring one of the plurality of discrete ribs.

6. The turbine vane assembly of claim 1, wherein the sleeve comprises self-lubricating materials.

7. The turbine vane assembly of claim 1, wherein the sleeve includes a body and an outer diffusion barrier coat adhered to the body.

8. The turbine vane assembly of claim 1, wherein the airfoil includes a radial outer end and a radial inner end that is spaced apart radially from the radial outer end, the radial inner end is tapered away from the spar, and the sleeve engages the radial inner end of the airfoil.

9. A turbine vane assembly comprising
a support strut made of metallic materials and extending radially relative to an axis,
a vane made of ceramic matrix composite materials that includes an airfoil arranged around the support strut, and
a sleeve located between the support strut and the airfoil and the sleeve engages the support strut and the airfoil to transmit force loads acting on the airfoil to the support strut and to allow the airfoil to slide continuously and radially relative to the support strut during use of the turbine vane assembly,
wherein the sleeve includes an attachment surface coupled with one of the support strut and the airfoil and a contact surface that engages directly the other of the support strut and the airfoil and the contact surface is convex, and
wherein the sleeve includes a body having a first end and a second end spaced apart from the first end to define a cutout that extends radially through the body.

10. The turbine vane assembly of claim 9, wherein the airfoil includes an anti-rotation feature located in the cutout defined by the sleeve.

11. The turbine vane assembly of claim 10, wherein the sleeve further includes an insert located in the cutout and engaged with the support strut and the anti-rotation feature of the airfoil.

12. The turbine vane assembly of claim 9, wherein the support strut includes an outer mount panel and a spar that extends radially inward from the outer mount panel and the vane includes an outer end wall positioned adjacent the outer mount panel, an inner end wall spaced apart radially from the outer end wall, and the airfoil extends radially between and interconnects the outer end wall and the inner end wall.

13. A turbine vane assembly comprising
a support strut made of metallic materials and extending radially relative to an axis,
a vane made of ceramic matrix composite materials that includes an airfoil arranged around the support strut, and
a sleeve located between the support strut and the airfoil and the sleeve engages the support strut and the airfoil to transmit force loads acting on the airfoil to the support strut and to allow the airfoil to slide continuously and radially relative to the support strut during use of the turbine vane assembly,
wherein the sleeve includes an attachment surface coupled with one of the support strut and the airfoil and a contact surface that engages directly the other of the support strut and the airfoil and the contact surface is convex, and
wherein the airfoil includes a radial first end and a radial second end that is spaced apart radially from the radial first end, the radial second end is tapered away from the support strut, and the sleeve engages the radial second end.

* * * * *